SMITH GARDNER.
Gas Burner.

No. 125,042.  Patented March 26, 1872.

Witnesses
Albert H. Hook
Jno. D. Patten

Inventor
Smith Gardner 125,042

UNITED STATES PATENT OFFICE.

SMITH GARDNER, OF NEW YORK, N. Y.

IMPROVEMENT IN GAS-BURNERS.

Specification forming part of Letters Patent No. 125,042, dated March 26, 1872.

Be it known that I, SMITH GARDNER, of the city, county, and State of New York, have invented an improvement in the manner of suspending glass bowls containing water or other transparent liquor under gas-burners.

The object or purpose of thus suspending them is to improve and intensify gas-light by transmitting it through the water or other liquid contained in the bowl.

I am aware that glass bowls or cups have been supported under burners for this purpose by attaching a ring to the gas-pipe, and sustaining the bowl within it by its projecting flange at the top.

It is necessary that bowls used for this purpose should be frequently discharged of their contents and again replenished; it is, therefore, desirable that they be so suspended that this can be accomplished with as little inconvenience as possible, but when suspended in the manner above described it cannot be accomplished without first shifting the position of the burner and then lifting the bowl up out of the ring. My improvement obviates the necessity of removing the burner or elevating the bowl preparatory to changing its contents.

Figure 1:
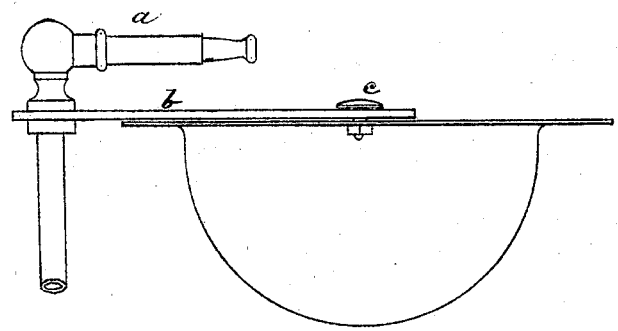
Figure 2:
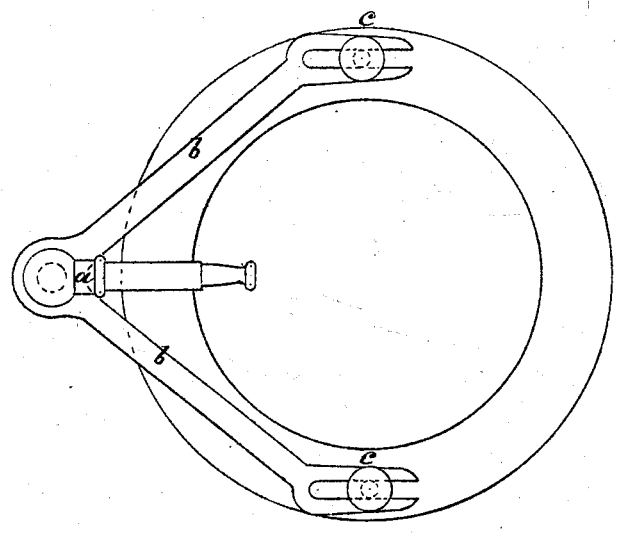
Figure 3:
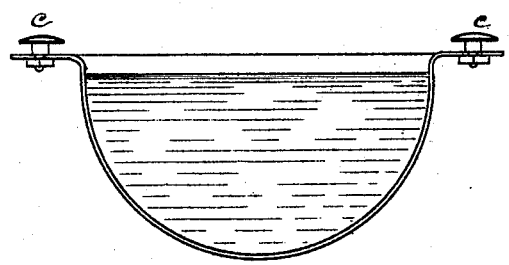

In the drawing, Figure 1 represents a side view of a bowl suspended in the manner I have invented; Fig. 2, a plan or bird's-eye view of the same, and of the rest by which it is suspended; Fig. 3, a sectional view of a bowl separately.

A represents a horizontal burner attached to the end of a gas-pipe, and extending out about one-third of the distance across the top of a bowl suspended for the purpose above specified. $b\ b$ represents a rest by which the bowl is suspended. It resembles in form a fork, having at the base of its prongs a flat projection about an inch and a half in length, which is perforated to allow the end of a gas-pipe upon which it is seated to pass up through it. The burner is screwed down on it and confines it in its place. The prongs of the rest extend out from the base about four inches, and so diverge that the space between them at the point of termination corresponds very nearly in extent with the diameter of the bowl. The ends of the prongs are parallel, as shown in Fig. 2. A longitudinal opening is made in each prong of the rest, adapt to receive the suspending device. $c\ c$ represent bolts which are connected with the rim of the bowl, and extend up above it far enough to allow the prongs of the rest to pass under the head between it and the top of the rim.

The apparatus being thus constructed, the bowl can then be easily and quickly suspended below the prongs of the forks formed by the longitudinal openings in the rest, as above described; the suspension being accomplished by passing the upper projection of the bolts in between the prongs of the forks with their heads resting on them, as shown on the drawings, Fig. 2.

I claim as my invention—

The rest $b\ b$, attached to a gas-burner, and provided with forked arms adapted to engage with the bolts $c\ c$ of the water-bowl, as herein set forth.

SMITH GARDNER.

Witnessed by—
T. H. DARLINGTON,
C. A. BROWN.